United States Patent
Hughes

(10) Patent No.: US 7,021,410 B2
(45) Date of Patent: Apr. 4, 2006

(54) METHOD AND SYSTEM FOR DETERMINING THE TORQUE REQUIRED TO LAUNCH A VEHICLE HAVING A HYBRID DRIVE-TRAIN

(75) Inventor: Douglas A. Hughes, Wixom, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/306,499

(22) Filed: Nov. 27, 2002

(65) Prior Publication Data
US 2004/0099454 A1    May 27, 2004

(51) Int. Cl.
*B60L 11/02* (2006.01)
(52) U.S. Cl. ............ 180/65.2; 180/65.3; 701/22; 701/94; 903/941; 903/942
(58) Field of Classification Search ......... 180/65.2, 180/65.3, 65.4, 65.6, 65.7, 65.8, 233; 701/51, 701/70, 74, 84, 85, 94, 22
See application file for complete search history.

(56) References Cited

U.S. PATENT DOCUMENTS

| | | | |
|---|---|---|---|
| 6,173,226 B1 * | 1/2001 | Yoshida et al. ............... 701/51 |
| 6,177,773 B1 | 1/2001 | Nakano et al. |
| 6,249,735 B1 * | 6/2001 | Yamada et al. .............. 701/65 |
| 6,269,296 B1 * | 7/2001 | Toukura et al. .............. 701/80 |
| 6,356,817 B1 * | 3/2002 | Abe ............................ 701/22 |
| 6,428,444 B1 * | 8/2002 | Tabata ......................... 477/3 |
| 6,554,088 B1 * | 4/2003 | Severinsky et al. ........ 180/65.2 |
| 6,679,807 B1 * | 1/2004 | Kato et al. .................. 477/107 |
| 6,698,541 B1 * | 3/2004 | Sakakiyama ................ 180/233 |
| 2002/0105188 A1 | 8/2002 | Tomikawa |
| 2002/0165059 A1 | 11/2002 | Supina et al. |

FOREIGN PATENT DOCUMENTS

| EP | 0 780 256 | 6/1997 |
|---|---|---|
| EP | 1 145 896 | 10/2001 |

OTHER PUBLICATIONS

SAE International Publication Issued Mar. 96 entitled "Surface Vehicle Recommended Practice".
International Search Report dated Mar. 17, 2004 (3 pages).

* cited by examiner

*Primary Examiner*—Jeff Restifo
(74) *Attorney, Agent, or Firm*—Rader, Fishman & Grauer PLLC

(57) ABSTRACT

A method and system are provided for determining the torque required to launch a vehicle having a hybrid drive-train that includes at least two independently operable prime movers. The method includes the steps of determining the value of at least one control parameter indicative of a vehicle operating condition, determining the torque required to launch the vehicle from the at least one determined control parameter, comparing the torque available from the prime movers to the torque required to launch the vehicle, and controlling operation of the prime movers to launch the vehicle in response to the comparing step. The system of the present invention includes a control unit configured to perform the steps of the method outlined above.

20 Claims, 2 Drawing Sheets

METHOD AND SYSTEM FOR DETERMINING THE TORQUE REQUIRED TO LAUNCH A VEHICLE HAVING A HYBRID DRIVE-TRAIN

This invention was made with Government support under NREL Subcontract No. ZCL-2-32060-01, Prime Contract DE-AC36-99GO10337 awarded by the Department of Energy. The government has certain rights in this invention.

BACKGROUND OF THE INVENTION

1. Field of the Invention

The present invention relates generally to hybrid drive-train systems for motor vehicles and more particularly to a method and apparatus for determining the torque required to launch the vehicle and for controlling operation of the hybrid drive-train in accordance with the required torque.

2. Description of the Related Art

A direct hybrid drive-train system typically includes a reduced capacity internal combustion engine, such as a diesel engine, which is operated in parallel with a second prime mover, such as an electric or hydraulic motor. Compared to the internal combustion engine employed in a conventional vehicle drive-train system, i.e., a drive-train system employing only an internal combustion engine, an internal combustion engine in a hybrid drive-train system has a reduced torque output capacity because its output may be supplemented by the second prime mover. Accordingly, a hybrid drive-train system has a limited ability to launch the vehicle using one prime mover independently of the other, particularly when the vehicle is being launched on a grade. To maintain the ability to launch a hybrid vehicle in a variety of operating conditions, particularly when only one of the prime movers is active, it would be beneficial to first determine the torque required to launch the vehicle. The torque required to launch the vehicle could then be used to determine whether the engine and the motor would be operated simultaneously to launch the vehicle.

There are several vehicle operating conditions which influence the torque required to launch a vehicle. The conditions that have a major impact are, the gross combined vehicle weight (GCW) and the grade or inclination of the road surface upon which the vehicle is resting. When these two major conditions are known, it is possible to identify the wheel torque required to launch the vehicle. While the grade of the road surface can be measured directly with an inclinometer, GCW is not readily available.

Automated vehicular systems using GCW as a control parameter and/or having logic for determining GCW may be seen by reference to U.S. Pat. Nos. 5,272,939; 5,335,566; 5,487,005 and 5,490,063, the disclosures of which are incorporated herein by reference. A system for resetting the highly filtered value of GCW upon sensing conditions indicative of the vehicle being at rest and/or the highly filtered value ($GCW_{CP}$) differing from a less-filtered test value ($GCW_{TEST}$) by greater than a predetermined value may be seen by reference to U.S. Pat. No. 5,491,630, the disclosure of which is also incorporated herein by reference in its entirety.

SUMMARY OF THE INVENTION

In view of the above, the present invention provides a method and system for determining the torque required to launch a vehicle employing a hybrid drive-train system, and for using the determined torque to control operation of the vehicle prime movers. The method includes the steps of determining the value for at least one control parameter indicative of a vehicle operating condition, determining the torque required to launch the vehicle from the at least one determined control parameter, comparing the torque available from the prime movers to the torque required to launch the vehicle, and controlling operation of the prime movers to launch the vehicle in response to the comparing step. The present invention also provides a system that includes a control unit configured to perform steps of the type outlined above.

In an embodiment of the invention, the system first determines a value for at least one control parameter, such as a control parameter indicative of vehicular gross combined weight, road grade or vehicle rolling resistance. The torque required to launch the vehicle is then determined from the at least one control parameter. Upon determination of which of the prime movers is activated, the torque available from the activated prime mover is compared to the torque required to launch the vehicle. Operation of the prime movers is then controlled to launch the vehicle in response to the comparison between the torque required to launch the vehicle and the output torque available from the prime movers.

Various additional aspects of this invention will become apparent to those skilled in the art from the following detailed description of the preferred embodiment, when read in light of the accompanying drawings

DESCRIPTION OF THE PREFERRED EMBODIMENTS

For purposes of illustration, the method/system of the present invention is disclosed as being associated with a hybrid vehicular drive-train that includes an automated mechanical transmission and at least two independently operable prime movers, such as an electric motor/generator and an internal combustion engine. However, it is understood that the system/method of the present invention may also be utilized in other types of hybrid drive-train systems, such as those employing a hydraulic motor/pump in combination with or in place of the electric motor/generator.

Figure 1:
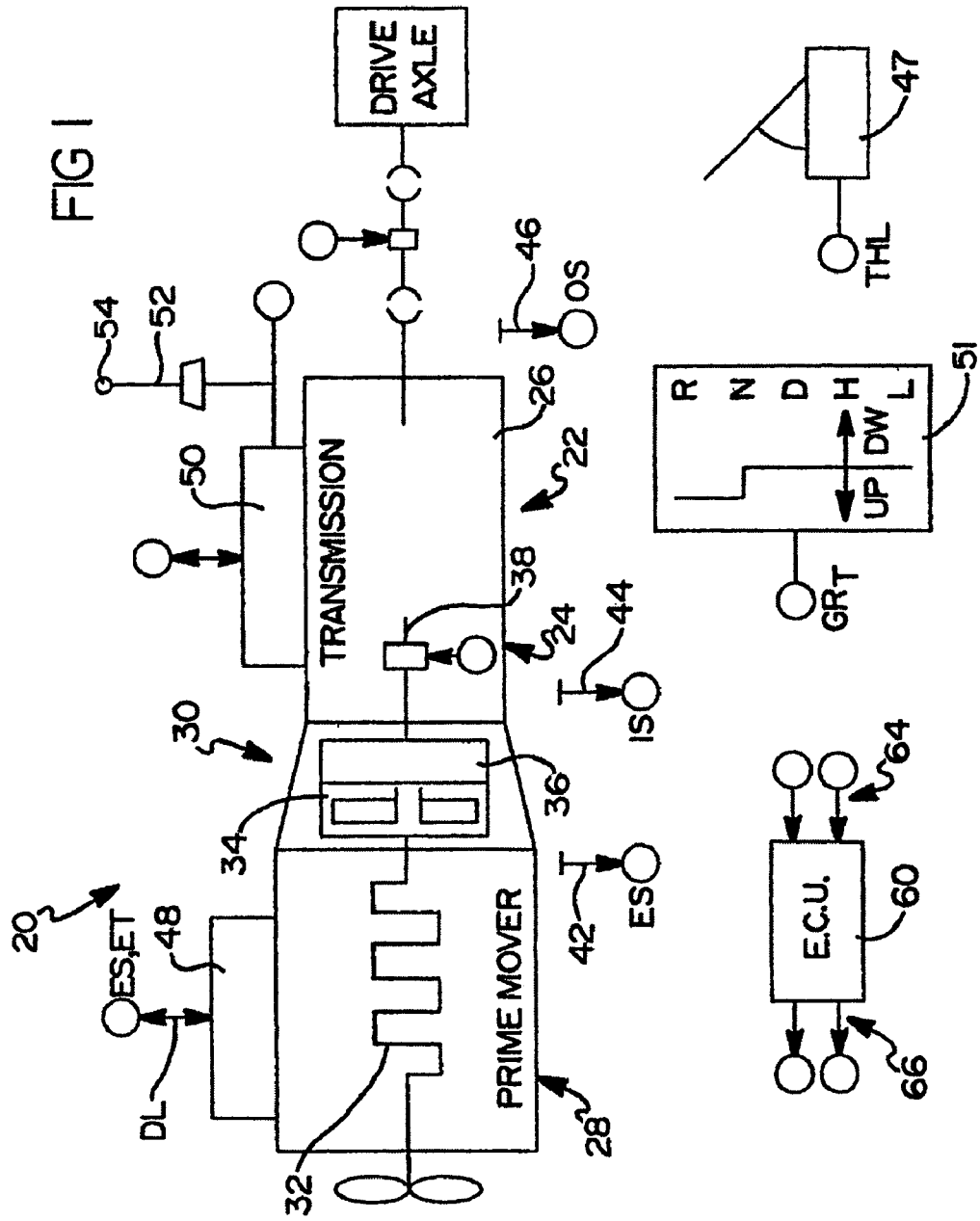
FIG. 1 is a schematic illustration of an exemplary hybrid vehicular drive-train system utilizing the control system and method of the present invention.

Referring to FIG. 1, a hybrid vehicle drive-train system 20 is shown that includes a multi-gear transmission 22 having a main transmission section 24, which may or may not be connected in series with a splitter-type auxiliary transmission section 26. Transmissions similar to mechanical transmission 24 are well known in the prior art and may be appreciated by reference to U.S. Pat. Nos. 3,105,395; 3,283,613 and 4,754,665, the disclosures of which are incorporated by reference.

Transmission 22 is drivingly connected to a first prime mover 28 by a master friction clutch 30. First prime mover 28 may take many forms, including without limitation an internal combustion engine or an electric motor. In the exemplary embodiment illustrated in FIG. 1, first prime mover 28 functions as an internal combustion engine having a crankshaft 32, which is attached to an input member 34 of master friction clutch 30. Input member 34 frictionally engages with, and disengages from, an output member 36, which is attached to an input shaft 38 of transmission 22.

Vehicle drive-train system 20 preferably includes at least one rotational speed sensor 42 for sensing engine rotational speed (ES), sensor 44 for sensing input shaft rotational speed (IS), and sensor 46 for sensing output shaft rotational speed (OS), and providing signals indicative thereof. The engaged and disengaged conditions of clutch 30 may be sensed by a position sensor or may be determined by comparing the speeds of the engine (ES) and the input shaft (IS). A sensor 47 is also provided for sensing a throttle pedal operating parameter, such as throttle position, and providing an output signal (THL) indicative thereof.

First prime mover 28 may be electronically controlled, including an electronic controller 48 communicating over an electronic data link (DL) operating under an industry standard protocol such as SAE J-1922, SAE J-1939, ISO 11898 or the like. An X-Y shift actuator 50 may be provided for automated or shift-by-wire shifting of the transmission main section and/or auxiliary section. A shift selector 51 allows the vehicle driver to select a mode of operation and provides a signal $GR_T$ indicative thereof. Alternatively, a manually operated shift lever 52 having a shift knob 54 thereon may be provided, which is manually manipulated in a known shift pattern for selective engagement and disengagement of various shift ratios. Shift knob 54 may include an intent-to-shift switch (not illustrated) by which the vehicle operator will request automatic engine fueling control to relieve torque lock and allow a shift to transmission neutral.

In the exemplary embodiment illustrated in FIG. 1, a second prime mover 49, such as an electric motor/generator, is operated in parallel with first prime mover 28 and is generally positioned between clutch 30 and transmission 22. A speed sensor 43 for sensing motor rotational speed (MS), and providing signals indicative thereof, may also be included in vehicle drive-train system 20. It will be appreciated, that the method/system of the present invention may also be used with hybrid drive-train systems having configurations other than that shown in FIG. 1, such as a hybrid drive-train system that employs a dual-countershaft mechanical transmission and no main clutch.

System 20 further includes a control unit 60, and more preferably an electronic control unit ("ECU"), such as a microprocessor based electronic control unit. ECU 60 receives input signals 64 from sensors 42, 43, 44 and 46 and processes the signals according to predetermined logic rules to issue command output signals 66 to system actuators, such as engine controller 48, motor/generator 49, and the like.

One or more engine torque limit values may be commanded on, or read from, data link (DL). By way of example, data links complying with SAE J1939 or similar protocol, allow ECU 60 to issue commands over the data link (DL) for the engine to be fueled in any one of several modes, such as (i) in accordance with the operator's application of the throttle, (ii) to achieve a commanded or target engine speed (ES=$ES_T$), (iii) to achieve a commanded or target engine torque (ET=$ET_T$) and (iv) to maintain engine speed and engine torque below limits (ES<$ES_{MAX}$ and ET<$ET_{MAX}$). Many input/informational signals, such as engine speed (ES), engine torque (ET), and the like may also be carried by data link (DL). Engine torque as used herein refers to a value indicative of an engine torque, usually gross engine torque, from which an output or flywheel torque may be calculated or estimated.

According to an embodiment of the present invention, a system/method is provided for determining the torque required to launch a vehicle employing a hybrid drive-train system, such as system 20, and for using the determined torque to control operation of first and second prime movers 28, 49. The torque required to launch the vehicle is determined using at least one control parameter indicative of a vehicle operating condition. Control parameters suitable for determining the torque required to launch the vehicle include, but are not limited to, a control parameter indicative of vehicular gross combined weight (GCW), a control parameter indicative of road grade and at least one control parameter indicative of total vehicle rolling resistance.

For purposes of determining gross combined vehicular weight GCW and/or for providing information to various vehicle systems, input shaft speed sensor 44, engine speed sensor 42, motor speed sensor 43 and/or output shaft speed sensor 46 may be utilized. Engine speed and/or output shaft speed information preferably is carried on the data link DL. The signals (OS) from speed sensor 46 or other sensors may be differentiated with respect to time to provide signals (dOS/dt) having a value indicative of vehicle acceleration and the like. ECU 60 will, preferably, include logic elements or rules for differentiating various input signals with respect to time. As an alternative, a separate ECU for GCW determination may be provided or the logic rules for determining vehicle GCW may be in engine controller 48 or another system ECU.

Output shaft speed sensor 46 may be replaced by a wheel speed signal from an ABS system and/or by sensors indicating input shaft speed and transmission gear ratio and/or by a signal indicative of vehicle speed such as from the vehicle speedometer. Input shaft speed (IS) may be taken as equal to engine speed (ES), available on datalink DL, when clutch 30 is fully engaged. Gear ratio (GR) may be determined from position sensors or the like associated with the transmission shift actuator 50, or may be calculated from output shaft and input shaft speed (GR=IS/OS). By way of example, engaged gear ratio may be determined when ES (=IS) equals OS*GR, for a known GR, over a predetermined period of time. Similarly, output shaft speed may be determined from input shaft speed and gear ratio (OS=IS/GR).

Vehicular GCW can be determined using existing information from an electronic engine (SAE J1922 or J1939 protocol) data link and/or using information from various sensors such as, for example, signals indicative of engine/drive-wheel torque and a signal indicative of vehicle or output shaft speed. For example, in a preferred embodiment, it can be mathematically proven that for two times, $t_1$ and $t_2$, which are close to each other (within seconds):

$$T_1 - T_2 = C \times W \times (A_1 - A_2)$$

where:
$T_i$=Wheel torque at time $t_i$;
C=Rolling radius/gravity constant;
W=Gross combination weight; and
$A_j$=Vehicle acceleration at time $t_j$.

The proof of this relationship may be seen by reference to aforementioned U.S. Pat. No. 5,491,630. Based upon this relationship, a value closely approximating (within about 2,000–3,000 pounds) GCW may be determined from the expression:

$$GCW = W = (T_1 - T_2) \div ((A_1 - A_2) * C)$$

Also, to minimize errors, a plurality of GCW values may be determined with $GCW_{CP}$ equaling an average:

$$GCW_{CP} = \frac{\sum_{i \geq 2}^{i} ((T_1 - T_i) \div ((A_1 - A_i) \times C))}{(i-1)}$$

It has been found that more accurate determinations of GCW may be obtained at completion of an upshift, especially if time $t_1$ is selected at the instant during an upshift immediately prior to engagement of the new ratio. At this instant, $T_1$, the torque supplied from the engine to the drive-wheels, is zero, and vehicle acceleration $A_1$ is a relatively low, possibly negative, value. Times $t_2, t_3 \ldots t_i$ may then be any point after engine power is sufficiently applied to the drive-wheels through the vehicle powertrain for up to four seconds after time $t_1$.

In practice, a new $GCW_i$ is calculated about every 40 milliseconds after $t_2$ until about four seconds after $t_1$. Preferably, $GCW_i$ values are then summed and averaged. The filtering/averaging technique adjusts for errors in each individual iteration due to torsional oscillations in the drivetrain, noise and the like, which may render individual iterations of GCW relatively inaccurate. When the counter reaches 1,000, the sum is divided in half, the counter set to 500, and the averaging continues. This will provide a filtering of the GCW value.

$$GCW_{CP} = \frac{[GCW_i + (499 \times GCW_{CP})]}{500}$$

According to a preferred embodiment, after time $t_1$, when the initial $A_1$ value is sensed, values of $A_2 \ldots A_i$ and $T_2 \ldots T_i$ will not be sensed until certain conditions are met, assuring that the subsequent values are different enough in magnitude from the time $t_1$ values to provide valid calculations for GCW. These conditions, determined from on-vehicle testing, are:

(1) $t_i$ is less than four seconds after $t_1$;
(2) the engine is operating at greater than a reference torque (about 19 percent of peak torque);
(3) vehicle acceleration is greater than a reference value (dOS/dt>about 20 RPM/sec.);
(4) input shaft speed greater than a reference value (IS>about 1,200 RPM for a heavy-duty diesel engine);
(5) vehicle acceleration has changed; and
(6) a shift is not in progress.

In practice, to get $T_i$, the drive-wheel torque at time $t_i$, the engine torque is sensed, preferably from the electronic data link DL, and used to derive the drive-wheel torque in a known manner. The engine and motor torque may be sensed when the vehicle is operating solely under the power of the prime mover from which the torque is determined. Generally, torque at the drive-wheels may be determined from the following:

Torque at wheels=(engine or motor torque)*(gear ratio)*(axle ratio)*(drive-train efficiency);

where engine or motor torque=[(percent engine or motor torque)*(peak engine or motor torque)]–[(torque to drive vehicle accessories)+(torque to accelerate the engine or motor)].

To achieve even greater accuracy, it is desirable to sense engine flywheel torque ($T_{FW}$) from the relationship:

$$T_{FW} = T_{EG} - T_{BEF} - T_{ACCES} - T_{ACCEL}$$

where:
$T_{FW}$=engine flywheel torque;
$T_{EG}$=gross engine torque;
$T_{BEF}$=base engine friction torque (includes the torque to overcome engine internal friction and the torque to rotate the engine manufacturer-installed accessories (i.e., water pump, oil pump, etc.));
$T_{ACCES}$=accessory torque (torque to operate vehicle accessories, such as air-conditioning, fans, lights, etc.); and
$T_{ACCEL}$=torque to accelerate engine, calculated from engine acceleration or deceleration and moment of inertia (I) of engine.

The road grade is preferably determined using an inclinometer or similar device, which provides input to the ECU 60 indicative of the grade of the surface upon which the vehicle is traveling. However, it will be appreciated that the degree of slope of a road upon which the vehicle is traveling may also be determined according to specified calculation formula, such as using detected values of the vehicle running speed and speed of the first and second prime movers.

Figure 2:
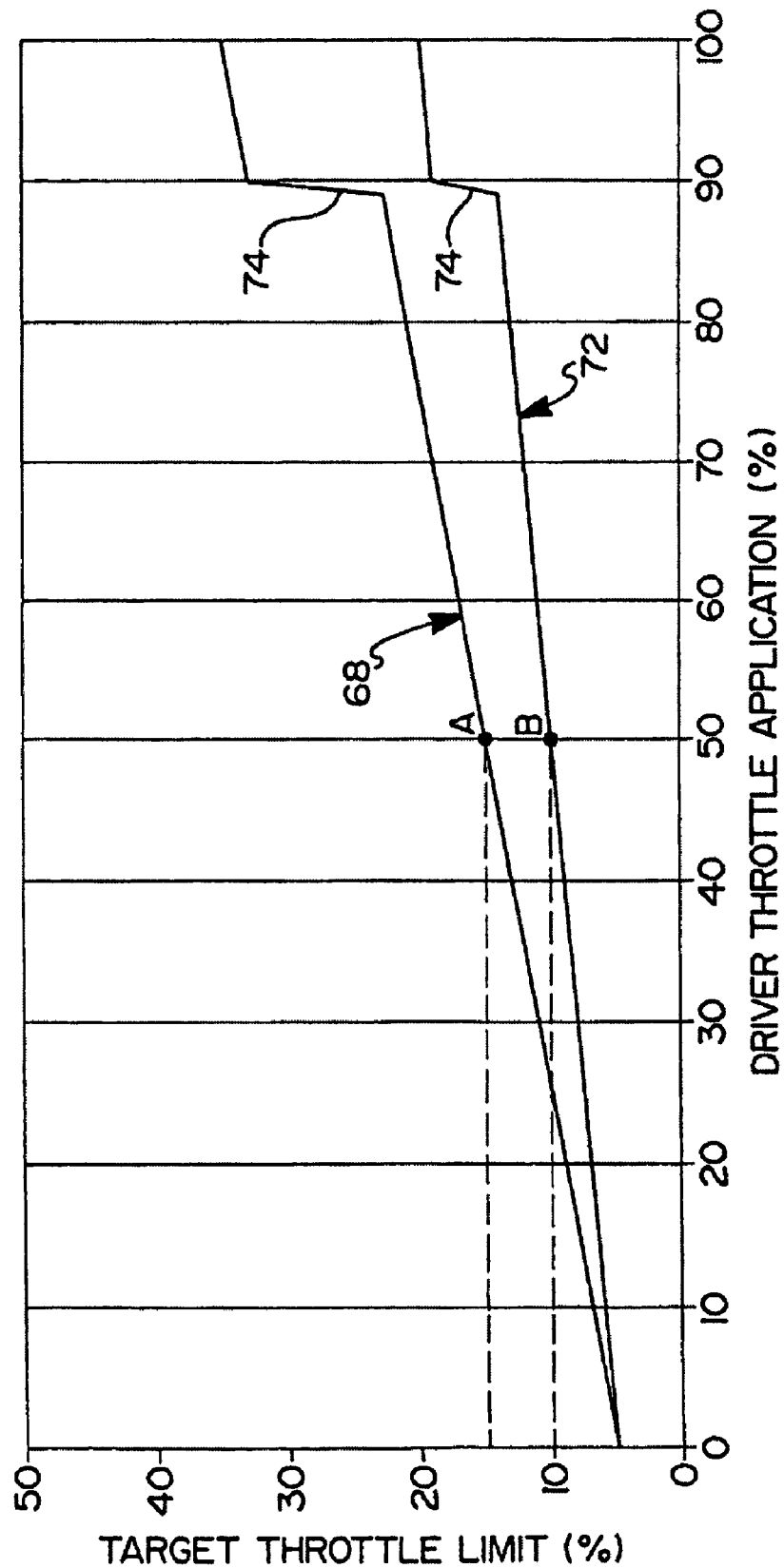
FIG. 2 is a schematic illustration, in flow chart format, of a control method of the present invention for determining the torque required to launch a vehicle employing a hybrid drive-train system, and for using the determined torque to control operation of the vehicle prime movers.

Referring now to FIG. 2, there is illustrated in flow chart format a preferred method for determining the torque required to launch a vehicle employing a hybrid drive-train system, and for using the determined torque to control operation of first and second prime movers 28, 49. Initially, the method of the invention begins at step S2.1, which corresponds to the commencement of operation of the vehicle. Next, the value of at least one control parameter indicative of a vehicle operating condition is determined (S2.2)

In an embodiment of the invention, step (S2.2) is further defined by determining a control parameter value indicative of vehicle gross combined weight (GCW), as described above. A value of a control parameter indicative of road grade may be determined contemporaneous with or subsequent to the GCW determination. Because the control parameters corresponding to vehicular gross combined weight (GCW) and road grade are generally determined while the vehicle is moving, an inquiry is then made to determine if the vehicle is at rest (S2.3), prior to determining the torque required to launch the vehicle.

If the vehicle is at rest, the torque required to launch the vehicle is determined using the previously determined control parameter values, e.g., GCW and road grade (S2.4). For example, the wheel torque required to move the vehicle at a predetermined speed may be expressed as:

$$T_{req} = \frac{WP_{req} \times 5252}{RPM_{wheel}}$$

where:

$$WP_{req} = \frac{GCW \times V}{375} \times \sin\left[\left(\tan^{-1}\left[\left(\frac{P}{100}\right)\right]\right)\right]$$

and where:
$T_{req}$=Wheel torque required to launch the vehicle (ft. lb.);

$WP_{req}$=Wheel power required to overcome the gradient (HP);
$RPM_{wheel}$=Wheel speed in revolutions per minute;
P=Gradient (%);
GCW=Gross combined weight (lbs); and
V=Desired vehicle velocity upon vehicle launch (mph).

Alternatively or in combination with the GCW and grade data, a control parameter indicative of total vehicle rolling resistance may be determined in step S2.2 and used to determine the torque required to launch the vehicle (S2.4). For example, the wheel power required to move the vehicle at a predetermined speed may be expressed as:

$$WP_{req} = WP_R + WP_A + WP_P$$

where:

$$WP_R = \frac{GCW \times (RC_1 + RC_2 \times V) \times SC \times V}{375 \times 1000}$$

$$WP_A = \frac{C_D \times C_A \times FA \times V^3 \times 0.0024}{375}$$

$$WP_P = \frac{GCW \times V}{375} \times \sin\left[\left(\tan^{-1}\left[\left(\frac{P}{100}\right)\right]\right)\right]$$

and where:
$WP_{req}$=Wheel power required to move the vehicle (HP);
$WP_R$=Wheel power to overcome rolling resistance (HP);
$WP_A$=Wheel power to overcome air resistance (HP);
$WP_P$=Wheel power to overcome percent grade (HP);
$RC_1$ and $RC_2$=rolling constants for the vehicle tires;
SC=is a constant for the road surface;
$C_D$=Air drag coefficient of the vehicle;
$C_A$=Air density correction for altitude;
FA=Frontal area of the vehicle (ft$^2$);
P=Gradient (%);
GCW=Gross combination weight (lbs); and
V=Desired vehicle speed upon launch of the vehicle (mph).

Once the torque required to launch the vehicle is determined, the required torque is compared to the rated torque available from the currently active prime mover or, alternatively, both first and second prime movers 28 and 49 (S2.5). Since it is common for hybrid vehicles to be operated under the power of a single prime mover, only one of first prime mover 28 and second prime mover 49 may be active (operating) at any given time. For example, the second prime mover functioning as an electric motor may be independently operated to launch the vehicle while the first prime mover, operating as an engine, is inactive. The engine can then be started after the vehicle is moving, which overcomes the inefficiencies associated with operating an internal combustion engine during vehicle launch.

If the torque available from the active prime mover is greater than the torque required to the launch the vehicle, the vehicle is launched using only the torque of the active prime mover. In contrast, if the torque available from the active prime mover is less than the torque required to launch the vehicle, the previously inactive prime mover is activated (S2.6) and first and second prime movers 28 and 49 are operated jointly to launch the vehicle.

Additionally, the control system may terminate operation of prime mover driven vehicle accessories, such as an air conditioning compressor, when the torque available from the active prime mover is less than the torque required to launch the vehicle. The control system then awaits vehicle launch (S2.7) and begins the process of determining the required control parameters (GCW, road grade, etc.) once the vehicle is in motion (S2.8).

Although certain preferred embodiments of the present invention have been described, the invention is not limited to the illustrations described and shown herein, which are deemed to be merely illustrative of the best modes of carrying out the invention. A person of ordinary skill in the art will realize that certain modifications and variations will come within the teachings of this invention and that such variations and modifications are within its spirit and the scope as defined by the claims.

What is claimed is:

1. A method for determining the torque required to launch a vehicle employing a hybrid drive-train system that includes at least two prime movers, comprising:
    determining the value of at least one control parameter indicative of a vehicle operating condition;
    determining a representative value of a torque available from at least one of the prime movers
    determining the torque required to launch the vehicle from the at least one determined control parameter;
    comparing the torque available from at least one of the prime movers to the torque required to launch the vehicle; and
    controlling operation of the prime movers to launch the vehicle in response to a difference between the torque available from the prime movers and the torque required to launch the vehicle.

2. The method of claim 1, further including the step of operating both prime movers when the torque available from either of the individual prime movers is less than the torque required to launch the vehicle.

3. The method of claim 1, wherein the step of determining the value of at least one control parameter is performed while the vehicle is in motion.

4. The method of claim 1, wherein the step of determining the torque required to launch the vehicle is performed while the vehicle is at rest.

5. The method of claim 1, wherein the step of determining the value of at least one control parameter is further defined by determining the value of at least one of a control parameter indicative of vehicular gross combined weight, a control parameter indicative of road grade and a control parameter indicative of total vehicle rolling resistance.

6. The method of claim 5, wherein the step of determining the value of at least one control parameter is further defined by determining the value of a control parameter indicative of vehicular gross combined weight and a control parameter indicative of road grade.

7. The method of claim 5, wherein the control parameter indicative of vehicular gross combined weight is calculated.

8. The method of claim 5, wherein the control parameter indicative of road grade is measured.

9. The method of claim 2, further including the step of controlling operation of prime mover driven vehicle accessories in response to the comparing step.

10. A method for determining the torque required to launch a vehicle employing a hybrid drive-train system that includes at least two prime movers, comprising:
    determining a value of at least one of a control parameter indicative of vehicular gross combined weight and a control parameter indicative of road grade;
    determining the torque required to launch the vehicle from the at least one determined control parameter;
    determining which of the prime movers is activated;

comparing the torque available from the activated prime mover to the torque required to launch the vehicle; and controlling operation of the prime movers to launch the vehicle in response to the comparing step.

11. A system for determining the torque required to launch a vehicle employing a hybrid drive-train that includes at least two prime movers, comprising:

a control unit for determining the value of at least one control parameter indicative of a vehicle operating condition, the control unit configured to determine the torque required to launch the vehicle using the determined control parameter and to compare the torque required to launch the vehicle to the torque available from the prime movers, the control unit further configured to control operation of the prime movers in response to the comparison between the torque required to launch the vehicle and the torque available from the prime movers.

12. The system of claim 11, wherein the control unit operates both prime movers when the torque available from either of the individual prime movers is less than the torque required to launch the vehicle.

13. The system of claim 11, wherein the at least one control parameter is determined while the vehicle is in motion.

14. The system of claim 11, wherein the torque required to launch the vehicle is determined while the vehicle is at rest.

15. The system of claim 11, wherein the control parameter is indicative of at least one of vehicular gross combined weight, road grade and total vehicle rolling resistance.

16. The system of claim 15, wherein the control parameter indicative of vehicular gross combined weight is calculated.

17. The system of claim 15, wherein the control parameter indicative of road grade is measured.

18. The system of claim 15, wherein the control parameter indicative of total vehicle rolling resistance is defined by at least one of grade resistance, road/tire interface resistance and aerodynamic drag.

19. The system of claim 11, wherein the control unit is configured to control operation of prime mover driven vehicle accessories in response to the comparison between the torque required to launch the vehicle and the torque available from the individual prime movers.

20. A hybrid vehicle power-train system comprising:

at least two independently operable prime movers;

a device for transmitting the output torque of the prime movers to the vehicle wheels; and a control unit for determining the value of at least one control parameter indicative of a vehicle operating condition, the control unit configured to determine the wheel torque required to launch the vehicle from the at least one determined control parameter, to determine which of the prime movers is activated, to compare the output torque available from the activated prime mover to the wheel torque required to launch the vehicle, and to control operation of the prime movers to launch the vehicle in response to the comparison between the wheel torque required to launch the vehicle and the output torque available from the activated prime mover.

* * * * *